US012643320B2

(12) United States Patent
Mamizadeh

(10) Patent No.: US 12,643,320 B2
(45) Date of Patent: Jun. 2, 2026

(54) PRINTING SYSTEM OF SECURITY MATERIALS AND ANTI-FORGERY DOCUMENTS WITH RAISED PRINTING AND PROCESS THEREOF

(71) Applicant: SAM SECURITY PRINTING MATBAA ANONIM SIRKETI, Istanbul (TR)

(72) Inventor: Hassan Mamizadeh, Tabriz (IR)

(73) Assignee: SAM SECURITY PRINTING MATBAA ANONIM SIRKETI, Istanbul (TR)

( * ) Notice: Subject to any disclaimer, the term of this patent is extended or adjusted under 35 U.S.C. 154(b) by 495 days.

(21) Appl. No.: 17/923,924

(22) PCT Filed: Jul. 16, 2020

(86) PCT No.: PCT/IB2020/056708
§ 371 (c)(1),
(2) Date: Nov. 8, 2022

(87) PCT Pub. No.: WO2021/014296
PCT Pub. Date: Jan. 28, 2021

(65) Prior Publication Data

US 2023/0191816 A1 Jun. 22, 2023

(51) Int. Cl.
*B41F 11/02* (2006.01)
*B41F 11/00* (2006.01)
(Continued)

(52) U.S. Cl.
CPC .............. *B41F 11/02* (2013.01); *B41F 11/00* (2013.01); *B41M 3/144* (2013.01);
(Continued)

(58) Field of Classification Search
None
See application file for complete search history.

(56) References Cited

U.S. PATENT DOCUMENTS 5,627,578 A * 5/1997 Weintraub ............... B41M 7/02
118/46
5,837,042 A 11/1998 Lent et al.
(Continued)

FOREIGN PATENT DOCUMENTS

CN 103879138 A 6/2014
CN 107379790 A 11/2017
(Continued)

OTHER PUBLICATIONS

European Search Opinion for Application 20845133.6 dated Apr. 29, 2024 (Year: 2024).*

*Primary Examiner* — Joshua D Zimmerman
(74) *Attorney, Agent, or Firm* — Rankin, Hill & Clark LLP

(57) ABSTRACT

A system for printing documents and anti-forgery security papers especially banknotes is provided. The system includes a mechanical feeding mechanism, a hologram pattern print section, an invisible, fluorescence color and main colors pattern printing section using at least three units of ink jet, a varnish coating section, a rotating cylindrical silkscreen printing section for optical variable ink (OVI), a raised printing section, a delivery section, a paper and handle receiving section and a central computer control section. The system has been introduced to create various security features in securities wherein all of the processes including the raised printing are introduced in an all-in-on device.

55 Claims, 7 Drawing Sheets

(51) Int. Cl.

| | |
|---|---|
| ***B41J 11/00*** | (2006.01) |
| ***B41M 3/14*** | (2006.01) |
| ***B42D 25/29*** | (2014.01) |
| ***B42D 25/328*** | (2014.01) |
| ***B42D 25/387*** | (2014.01) |
| ***B42D 25/425*** | (2014.01) |

(52) U.S. Cl.

CPC ......... *B41J 11/00214* (2021.01); *B42D 25/29* (2014.10); *B42D 25/328* (2014.10); *B42D 25/387* (2014.10); *B42D 25/425* (2014.10)

(56) References Cited

U.S. PATENT DOCUMENTS

| | | | | |
|---|---|---|---|---|
| 2010/0236432 | A1* | 9/2010 | Foresti | B41M 1/10 101/167 |
| 2013/0229692 | A1 | 9/2013 | Brewington et al. | |
| 2015/0273918 | A1 | 10/2015 | Kurokawa et al. | |
| 2018/0015760 | A1* | 1/2018 | De Mondt | B41M 3/008 |
| 2018/0215136 | A1 | 8/2018 | Schaede | |

FOREIGN PATENT DOCUMENTS

| | | | |
|---|---|---|---|
| EP | 2006093 | A2 | 12/2008 |
| JP | H06183128 | A | 7/1994 |
| WO | 2007113640 | A2 | 10/2007 |
| WO | 2019211606 | A1 | 11/2019 |

* cited by examiner

PRINTING SYSTEM OF SECURITY MATERIALS AND ANTI-FORGERY DOCUMENTS WITH RAISED PRINTING AND PROCESS THEREOF

CROSS REFERENCE TO THE RELATED APPLICATIONS

This application is the national phase entry of International Application No. PCT/IB2020/056708, filed on Jul. 16, 2020, which is based upon and claims priority to Iranian Patent Application No. 139850140003003348, filed on Jul. 19, 2019, the entire contents of which are incorporated herein by reference.

TECHNICAL FIELD

The technical background of the present invention generally relates to the printing industry and more particularly anti-forgery documents printing wherein the raised print is used to enhance the security.

BACKGROUND

Raised printing is the most import security element and feature in printing anti-forgery documents such as paper money, securities, banknotes, banking papers and security packaging wherein in current usual technology the Intaglio printing system is used in security print machinery. Traditionally in this common technology the desired print patterns are carved on some plates or gravers via using some methods such as sharp swarf-removing tools, engraving, CNC, laser, and gravure working acid. Then, the ink (at most four separate colors) transfers from gelatin into the carved parts of the plate through gelatin plates. In the next stage, the security documents are passed through the engraved plate cylinder and another metal cylinder; in this way the ink available in the gravure transfers to the paper as the result of the pressure applied by the cylinder and the plate. After the ink dries, the pattern will be created as palpable and raised print. Generally, the securities and anti-forgery printing line is composed of six machineries, which impose some problems and limitations:

- In order to print just one document with all usual security features at least six huge machines are needed. This results in system failure and much paper wasting beside complexity of the process and system as well as the large size of the machineries.
- All the mentioned machineries are complement of each other for printing securities and need multiple infrastructures such as plates, gelatins, analogue rotary silk stencils, automatic numerator systems, etc.

In the prior art:

In the dry offset, at least 16 separate colors are used to print the Guilloche security designs on both sides of securities; therefore, the rainbow printing system with a waterless plate is needed.

Gathering the tools and necessary facilities for printing process is time consuming so that sometimes only preparing them requires several days in addition to significant costs.

Often there are some problems in numerator system to generate serial number including numeration errors, back and forth of numeration, and wastes.

The mechanism and the process of printing with an invisible ink is time consuming and in low quality.

OVI inks (Multi-color, Optical variable inks) are used in silkscreen printing as they are the most important and sensitive inks for security, which are so-called variable inks. Variable inks are expensive and have some limitations in printing colors considering color combination and quality.

In Intaglio print system, engraved copper or steel plates are used which impose high infrastructure and production cost. The intaglio plates are used currently for printing securities but in the present invention the plates have been removed.

It is worth to note that the large companies which produce Intaglio devices in the world have been using the Intaglio plates as infrastructures for about 70 years, which is not only time consuming and expensive, but also it has limitation in number of colors and quality. It has not been observed yet the proposing of the combined colors for raised printing with this printing system. In other words, it is only possible to use colors completely separate (Pantone ink, separate print) and with the limitation of separate colors (at most 3 to 4 pantone colors). Most of the working systems in the printing area utilize similar technologies.

Some of progressive companies in this area cooperate with each other in upgrading: the engraving procedures in Intaglio or gelatin plates, gravure producing, operating mechanisms, paper transmission, types of inks, software and hardware, and in converting analogue systems to digital ones.

As an example the international application WO/2007/113640, discloses a process to make security papers wherein sealing the paper surface is conducted such that the sealing process is conducted using engraved intaglio plate at least on 80 percent of paper surface. In this process the raised pattern is created in the places where the ink is transmitted on the paper and in other parts which the plate has not engraved, flat print is created, therefore, at least a part of raised or flat print is conducted with transparent or semi-transparent ink.

Based upon the information obtained from the most prominent references and the societies of large printing houses in security printing, at present a single system and process of printing is used in most of the security paper printing houses. Intaglio printing technology and its common process has been used in different inventions for more than 7 decades, but the current technology is not cost-effective in printing security documents in low circulation. Therefore, this equipment is not effective for practice in small and medium enterprises (SMEs) such as medical, food, cosmetic and hygiene packaging, since their printing need is in low circulation compared with governmental documents printing such as paper money.

The people skilled in the art aware off the importance of raised print on the securities like paper money and of course, about their better palpability on new securities but, unfortunately the palpability lasts at maximum six months. Early decline in palpability of raised print is the important topic of international conferences on securities printing.

In existing technology of intaglio, the colors are covered on the printing plate and a Dr. Blade is used to remove colors from places without engraved patterns. But, some particles of color substances usually remain on the parts of the plate lacking of pattern because this type of ink removing is not ideal, therefore, the unremoved color particles are transmitted on the paper and create undesirable embossed points on the other parts of the paper, which decrease the quality and elegance of the final project.

In the present invention, the limitation in number of colors and circulation limitations in raised printed securities are not existing anymore. Furthermore, the most important feature of this area i.e. cost-effective and timesaving security raised print with a desirable quality and decreased infrastructural costs, makes this invention effective for anti-forgery securities, especially in SME professions more desirable compared with common methods.

The function of the invented technology in an integrated single machine equals to the six commonly used huge devices, in which there is no need to many infrastructures and initial costs. In addition, minimum (urgent demand of today's market) and maximum production circulation with a great quality and efficacy are provided by this invention. The present invention is aimed at improving and modifying the production of anti-forgery documents and packaging, as well as removing the traditional stereotypes and silkscreen cylinders.

SUMMARY

In the present invented technology, a special paper or other printing materials (hereafter referred to as: "PM") used for securities are introduced to the feeder system of the machine. The feeder moves the paper on the vacuum conveyor and the vacuum system of the conveyor makes the paper to be flat on the conveyor. In the second section of the system, hologram or gold foil printing is conducted on the paper. The units of the third section are designed for patterns and images, which should be printed invisibly using invisible inks. In the fluorescent printing section, Phosphorus ink is used to more brightness and prevention of copying for forgery. Subsequently, in the initial color print unit, the full color and high quality printing process of the main pattern, name, and identity of the project are transferred on the paper and then coating is conducted using cylinder printing system. In the coating system a water base coating which consists of Nano materials to avoid infected bacteria and to make the paper waterproof as well as to make the possibility of removing the smudges on the securities is utilized.

In the section of rotary silkscreen printing, a digital rotary silkscreen print using Riso technology is applied. The silkscreen printing is conducted using very beautiful and expensive OVI inks, which is one of the security features to print the desired images on the paper.

In the next section, the raised print is applied on the paper or printing material. An innovative system is applied to distribute and to transmit color pigments powder, which will be converted to the raised print. In drying channel, the raised prints are fixed. The final section of printing process is the delivery of the papers on the pallet. Furthermore, a computerized system and consul have been installed to facilitate the operator work as well as to make better control and transmit of the computerized pattern files.

The intaglio plates, gelatin plates, silkscreen meshes, offset plates, numerating modules and systems have not been used for printing all of the security features and elements, in the invented technology of security printing. Instead Inkjet technology is used in all steps of printing.

DETAILED DESCRIPTION OF THE EMBODIMENTS

Figure 1:
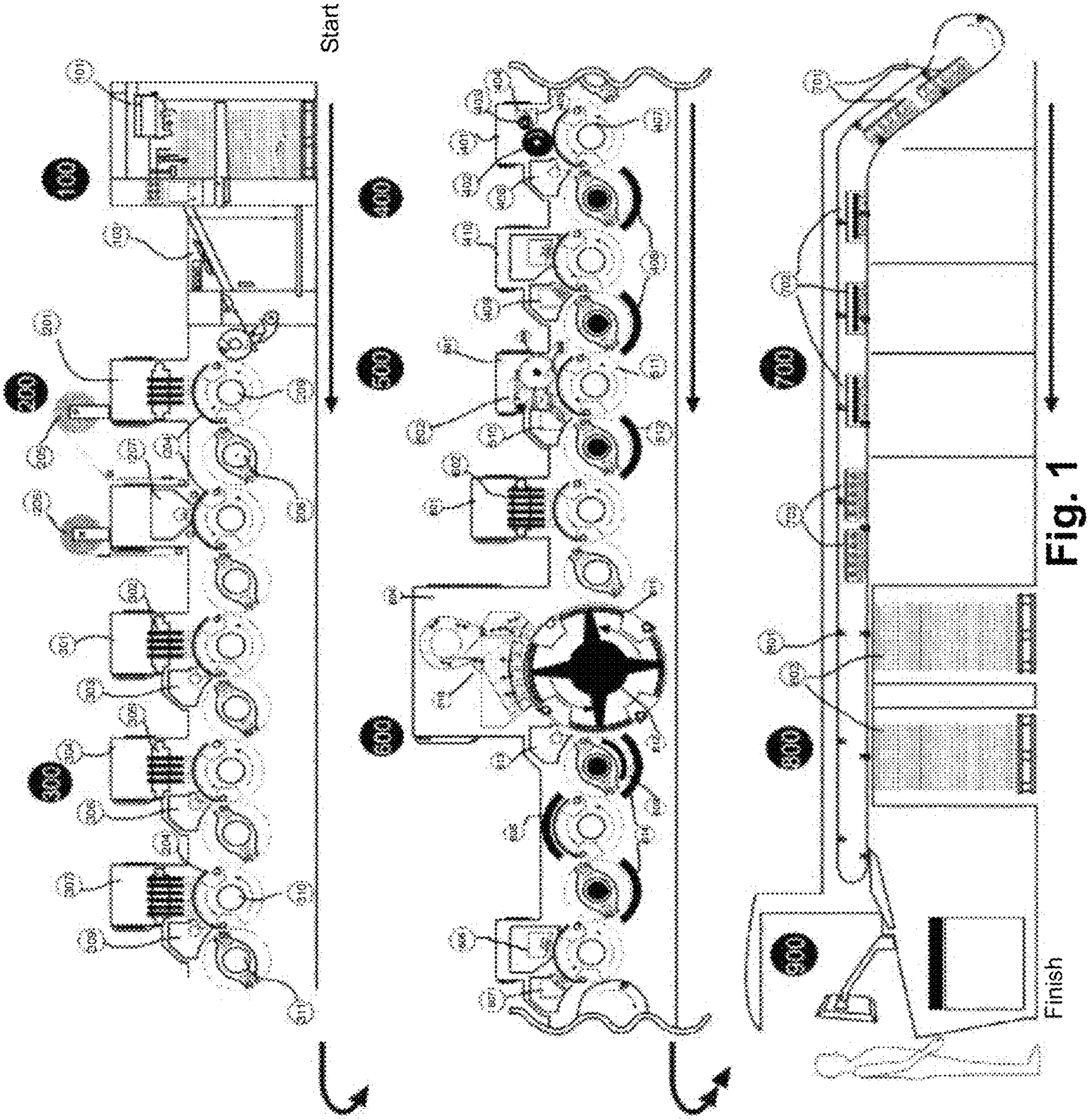
FIG. 1 shows a side view of a securities printing system full line according to one exemplary embodiment of the present invention (because of the limited paper width the figure is demonstrated in three lines but in fact it is a single continues system i.e. the whole line should be considered contiguous from the "Start" point to the "Finish" point in the direction of the arrows.)
Figure 2:
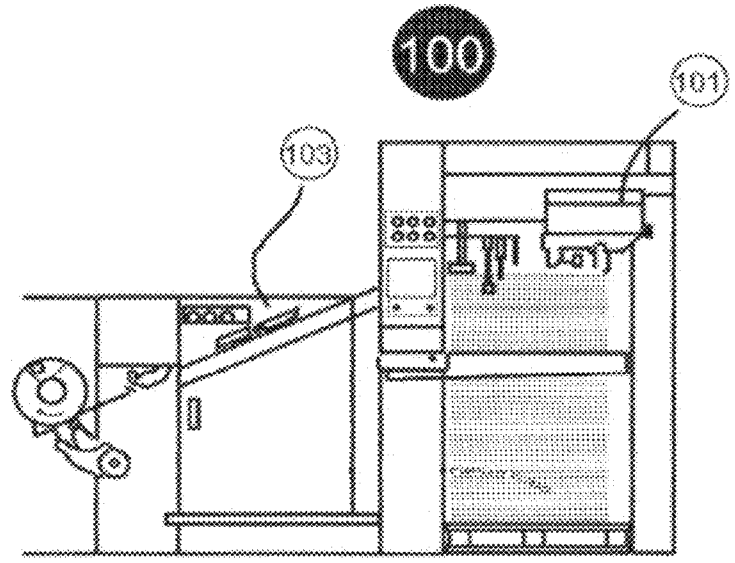
FIG. 2 shows a side view of a printing material feeder used for the security printing system of the invention.
Figure 3:
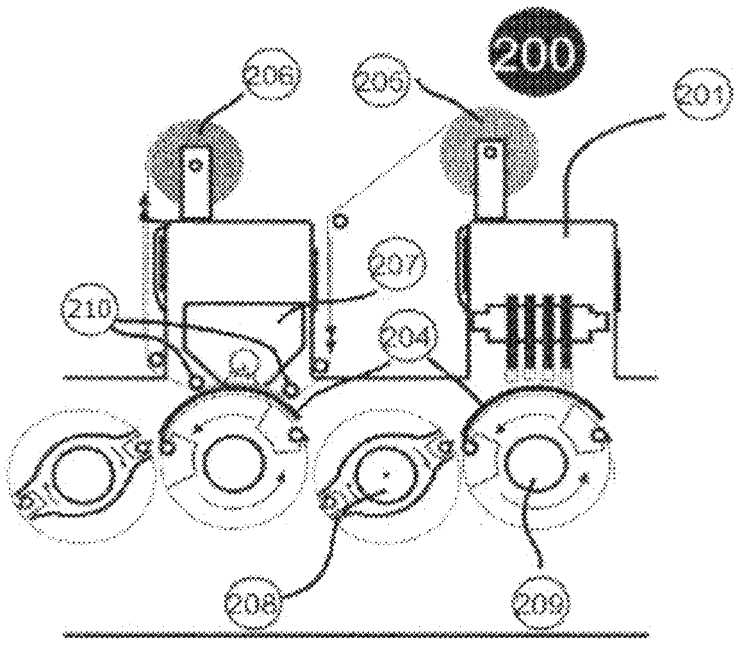
FIG. 3 shows a side view of a foil or hologram printing section of the invention.
Figure 4:
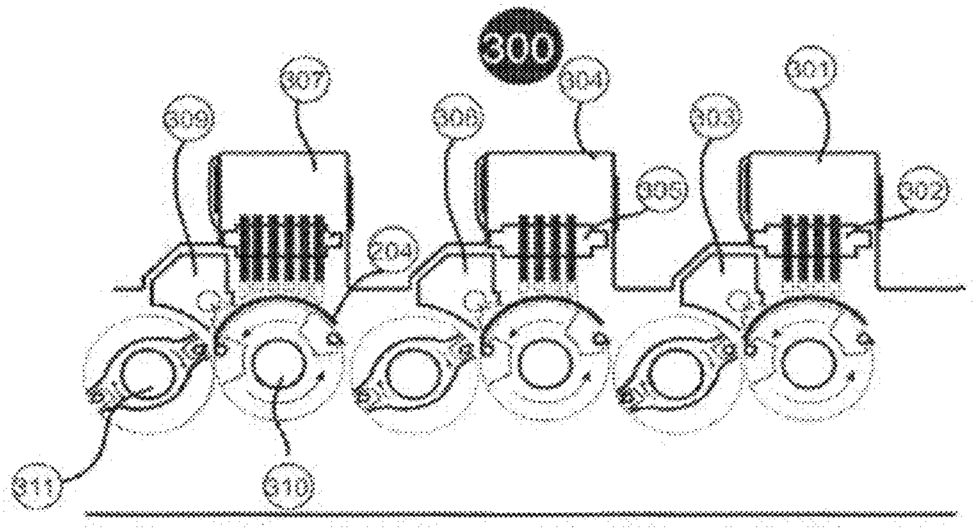
FIG. 4 shows a side view of a set of color printing units of the invention.
Figure 5:
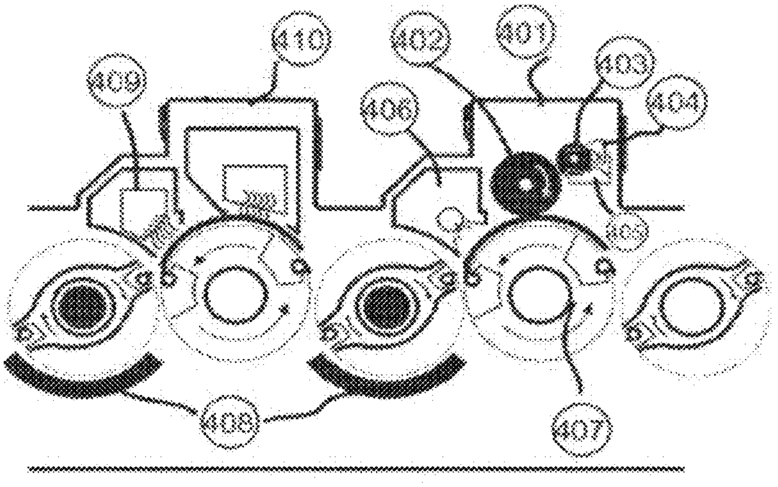
FIG. 5 shows a side view of a varnish coating units of the invention.
Figure 6:
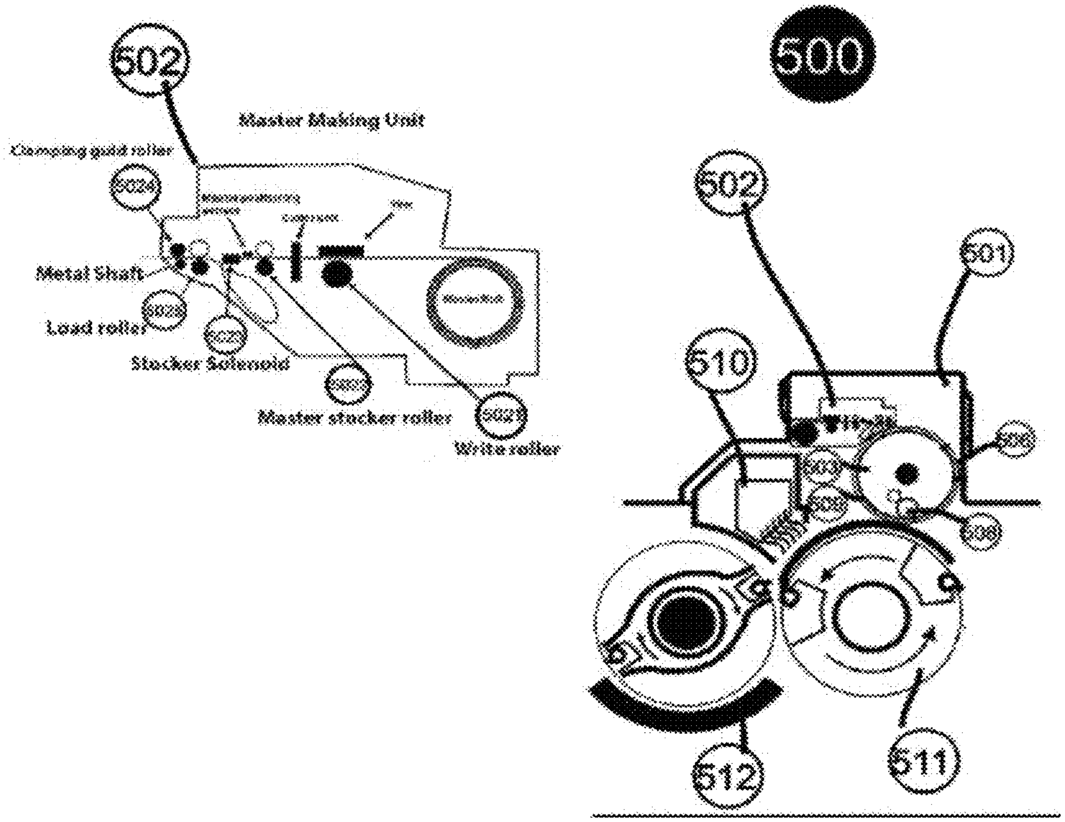
FIG. 6 shows a side view of a cylinder rotary silkscreen printing section for printing variable ink OVI in the present invention.
Figure 7:
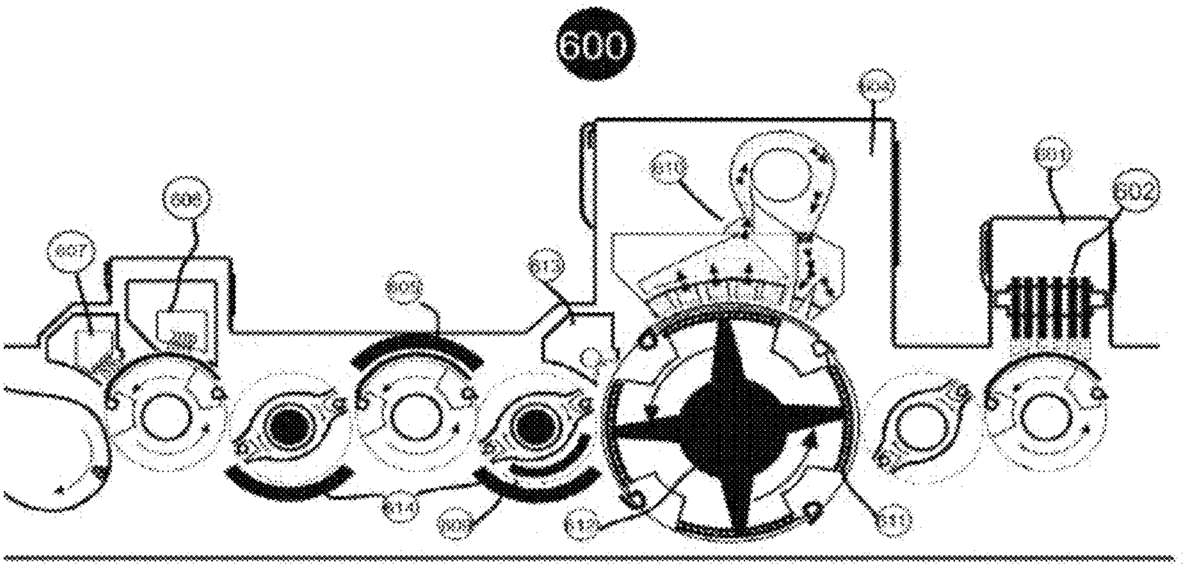
FIG. 7 shows a side view of a raised print system of the invention.
Figure 8:
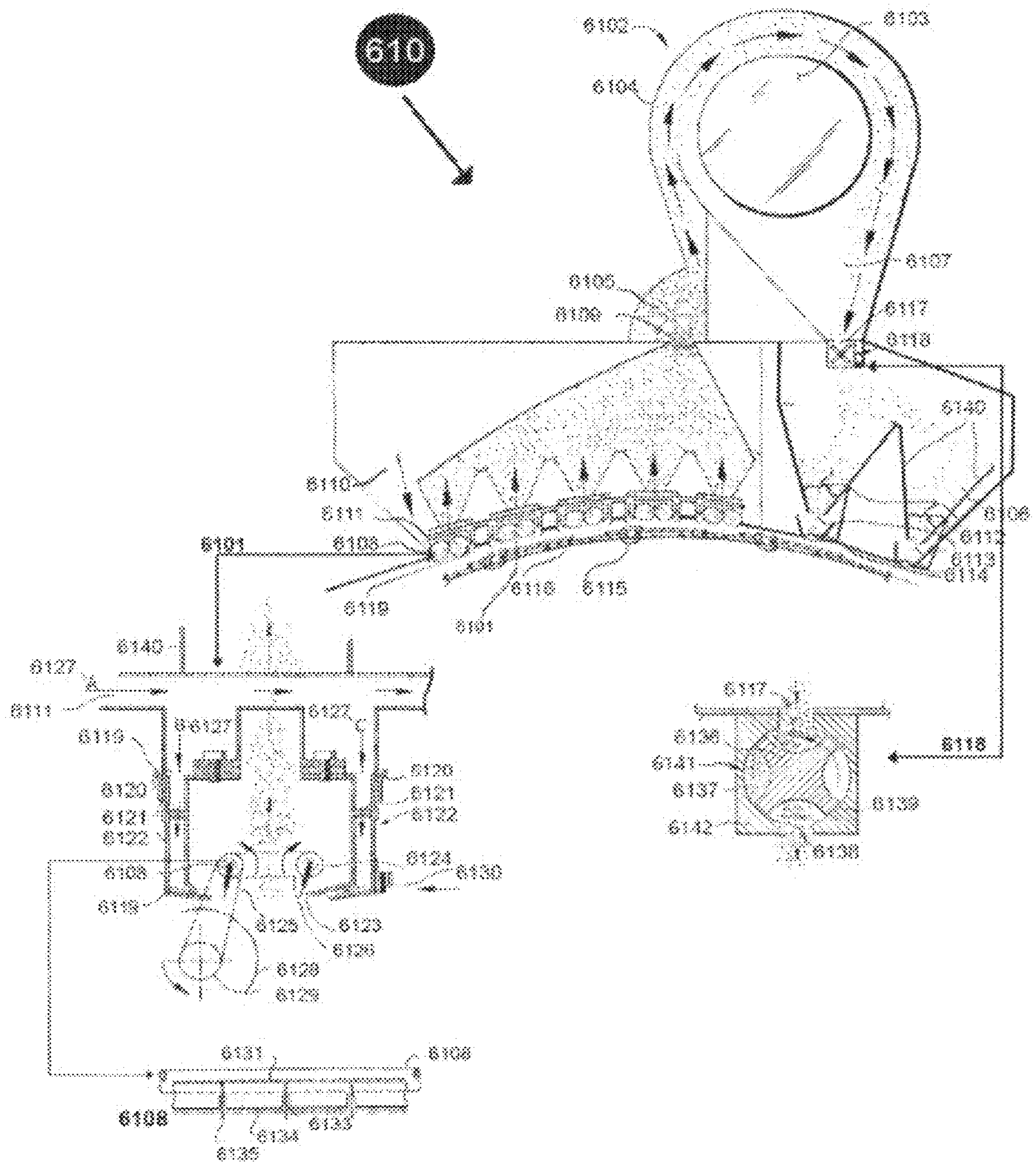
FIG. 8 illustrates a transmission and distribution system of the printing substances on the printing material in the present invention.
Figure 9:
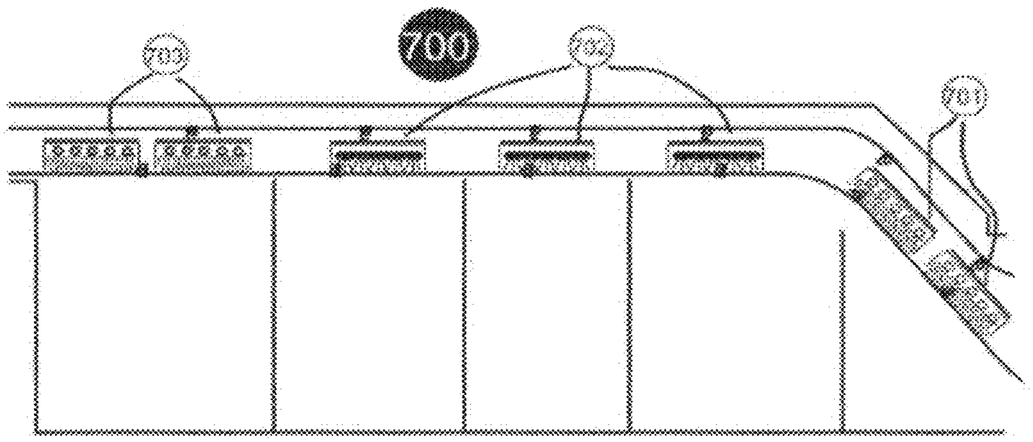
FIG. 9 shows a side view of a dryer channel of the invention.
Figure 10:
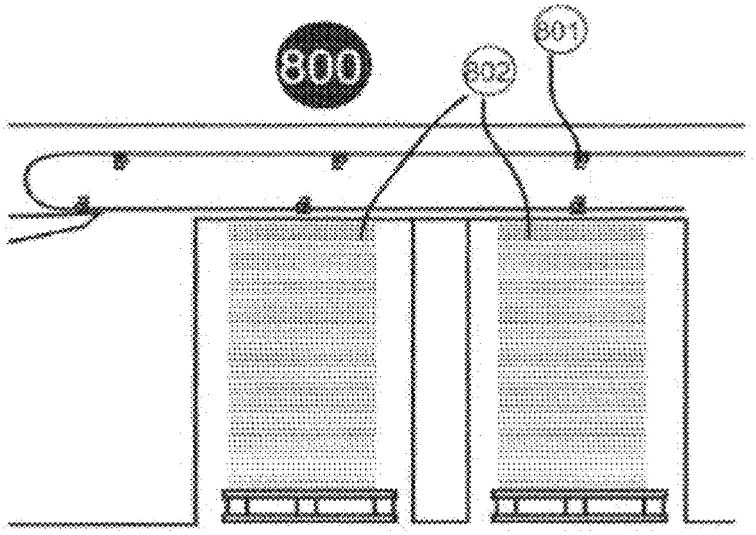
FIG. 10 illustrates a paper output from drying section in the present invention.
Figure 11:
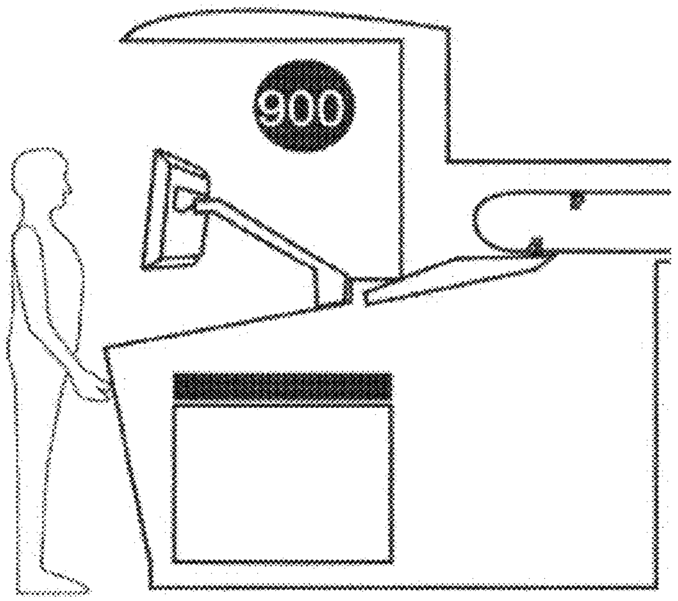
FIG. 11 shows a central computer controlling system of the invention.

In the present invention a mechanical mechanism is used for printing material feeding (204) in the first section (100), which is called 'Feeder' in the printing industry. Feeder system (101) consists of blower and suction mechanisms. This system can transfer the feeding material i.e. securities that are usually in paper form, forward in two methods, successively or alternately (204).

To move the paper steadily and without shaking, the paper is conveyed with the help of a vacuum system (103) used on the conveyor (104) and by the paper feeder from the beginning to the end of the conveyor.

The feeder system pushes forward the PM or paper (204) on the vacuum plates (103) in order to avoiding displacement.

In the second section (200), using the technology of digital Inkjet heads, the Inkjet print (203), which receives the file directly from the computer system (900) prints the patterns using the ultraviolet (UV) system (like the operation of Inkjet printers). The ultraviolet (UV) ink cannot be dried normally and it is only sensitive to ultraviolet (UV) light (207-303-306-309-613); therefore, as soon as the UV light is irradiated, the ink dries and it will not wear off at all. In this printing system, the UV system has been used in all printing units due to the greater stability on the PM and resistance against water, abrasion, and light.

In the second section (200), the printing of the hologram pattern is done using metal foils.

The process performed in this part of the system is such that the material (204) or the paper is passed from the vacuum conveyor (103) and from the printing unit (200), so the pattern file received from the computer (900) is printed or actually transferred on the PM (204) using ultraviolet (UV) varnish through the Inkjet system (203). Then, the PM and the Gold foil or hologram roll (205) enter the ultraviolet (UV) dryer pack (207). In the dryer pack, the ink printed on the material along with the polymerized and dried foil roll, performs the function of sticking the hologram material on the foil to the paper surface in addition to drying. At this time, only those parts of the paper on which the ink is printed, are polymerized against ultraviolet (UV) radiation and absorb the metal or hologram at the same time of drying through ultraviolet light, therefore the desired image is printed on the material (204).

In this section of the system, hologram foils are rolled into cone-shaped bobbins (205) in needed predetermined lengths. When the paper (204) is inserted under the hologram roll, both paper (204) and cone-shaped bobbins (205) are laminated under the pressure of the roller on the cylinder (209). In UV-drying system (207), the UV rays are irradiated on the material from around 3 cm over the foil and the printed UV ink is combined with polymer hologram foil. In other words, when the ink dries and hardens, those UV printed parts keep the hologram substances as printed pattern and the hologram cellophane with remaining hologram substances is separated from the paper and is transferred to the roll collector bobbin (206).

Transmission rollers (such as 208) only play the role of transferring paper among units.

The components of the third section (300) are related to invisible, fluorescent and the main colors printing, which are some of the features of security printing in the field of securities and banknotes printing. This operation can be performed in this part using an innovative system that is a new engineering, without the use of a plate.

In the third section (300), the same technology is used as Inkjet heads such as Unit (201), but this time four colors of invisible security ink using color heads, which will be colorless after printing the patterns on the material (204) and will not be seen by the unaided eyes. These patterns, which are printed with invisible ink, react under the ultraviolet (UV) 400 nm light, such as banknote detection devices, and thus make the invisible pattern to visible one in yellow, red, green, and blue colors as Pantone ink separate printing. Printing an ink combination of different colors can't be achieved with this type of ink. The UV ink series are used in this printing as well due to their durability and resistance, which after printing in the invisible printing unit the 'yellow, green, blue, red' colors (301) are dried in the UV dryer (303), and the PM enters the next stage.

The Inkjet head technology of 'Blue, Green, Orange, Red' colors (304) is also used in the fluorescent printing section. In these four-color Inkjet color heads, phosphorus and fluorescent ultraviolet (UV) ink series have been used separately for four separate Pantone colors, which have a certain transparency, reflection and reflection after printing the patterns on the PM (204). These inks are normally more transparent than common inks and can be seen under an ultraviolet (UV) lamp with a radiation frequency of 400 nm, such as banknote detection devices. Patterns on paper (204) with different colors such as yellow-blue-red-green are embossed by fluorescent print heads (305) and are dried under UV dryers (306) for further fixation and durability. Then, the paper is transferred to the next stage.

In part (307), operations are conducted with Guilloche security patterns on documents and papers to identify documents and packaging of companies, offices, or organizations.

The material (204) is passed through the initial color printing unit (307). This unit is also functions like the color technology unit (201) but it is used with two more colors and an extra head such that the CMYK+LM+LC, which are both the light blue and Light red magenta, the quality becomes multiplied better and the print is done as a combination of colors (which combines about 16 million colors). The Inkjet printer, prints the background pattern received from the computer (900), directly on the PM (204) with great quality and without the need for infrastructures like plates. For durability purposes, the PM (204) is dried using ultraviolet light (309) and then is sent to the next unit by cylinders (310) and (311).

In the covering varnish units (400), the PM (204) enters the varnish printing unit (401) and the whole surface of the PM is covered with varnish by the cylindrical printing system (402), then it is dried by UV dryer (406) if the UV ink used and in case of using air dry varnish (water base) it is dried with air in air dry unit (410), and then it is further dried with an infrared (IR) system of hot air dryer (408) and (409).

In the varnish section (400), the base antibacterial printing process is also applied on the PM (204). The varnish tank (405) is a liquid (Nano-material base) ink storage tank, in which a chrome cylinder (403), which is a copper roller with chromium coating and a processed coating of 200LPI tram is immersed. The varnish is transferred from the tray to the Anilox cylinder (402). The chromium roller (403) absorbs the material and the built-in Doctor Blade (404) makes the ink even on the roller surface. The coating is then transferred to the over 400LPI tram Anilox cylinder (402), and then the coating is transferred on the PM (204), which passes through the anilox cylinder of the coating printing (402) and the cylinder (407). Finally, the printed antibacterial varnish is dried and fixed in hot air dryers (408 and 409).

This stage makes printed documents and papers more durable. Applying this step of printing will make the securities waterproof, so, if something is written on the papers with pens or markers, it will be erased, and this will improve the long-term cleanliness and appearance of the documents.

The rotary silk screen cylindrical OVI (500) is dedicated to print the best security ink, which is the most attractive and expensive ink in security papers printing.

This type of printing or ink is used in expensive papers and documents. In Europe and the United States, OVI ink is used in banknotes but in many other countries it is used only on in national identity cards and passports. Being anti-forgery is the main feature of OVI, which is seen in different colors from different angles. For example, at a 90-degree view, it is green, and at a 45-degree view, it is golden (although of course a variety of these colors are available). So far, in the existing technology in the world, the traditional Riso silkscreen printing system is being used in the form of flat and rotary but in the present invention an innovative and unique process has been used in this part of the printing as well.

The rotary silkscreen printing unit (501) receives the image or pattern from the computer (900). In this system a Risograph printing technology (503), in which a laminated paper and polymer master (506) is created by the master creating system (502) is used. Benefiting from a thermal head, the master creating system (502) imprints the pattern on the master. Then the master is transferred around the cylinder (drum) (509) and the printing function is conducted in rotary silkscreen by squeegee roller (508), which is a kind of roller printing blade. Then, the ink is transferred on the Risograph drum by the pressure applied behind the engraved master. The image or pattern by the cylinder pressure (511) and the drum of the Risograph printing technology (503) will be imprinted on the PM (204). The printed pattern will become fixed in the dryer (510) by applying hot air.

The sixth section (600) of the present invention has been designed for the most important feature of the security documents.

In this part, the image is transmitted to Inkjet head technology (602) from the computer control console (900) in order to print the material (204). However, this time, colored heads (the four main colors of CMYK) have been used, and with the combination of these four main colors, 16 million colors can be made and printed. The pattern received by the Inkjet head is printed in the printing unit (601) on the PM (204).

As mentioned the UV ink will not dry out until it is exposed to UV light. In the present innovative technology, we have been able to use powder color substances in dry nano scale form, in the time interval of printing (602) and exposing to UV light (613). In other words, while the ultraviolet (UV) paint on the PM is still wet the powder color is applied to create the desired raised print using a thermo and ultrasonic upgraded system. In this part of the printing system and process, the color substances are fixed in the form of a raised print pattern. The raised pattern pigment transfer and distribution system (610) is the heart of the innovative printing system, which has been embedded in the raised Printing Unit (604).

The UV ink is used in Inkjet head technology (602) instead of Intaglio compound liquid pasty substances.

In the following, we will describe the components and performance of the pigments transmission and distribution of raised pattern system (610).

Transmission and distribution of raised pattern system (610) consists of several parts. A centrifuge system (6102) is responsible for providing suction and blowing air in different parts. The centrifuge system (6102) is equipped with a high speed centrifuge motor (6103) having a rotation speed of 10,000 rpm. Due to the rotation of the centrifuge motor (6103), a clockwise airflow is generated in the channel around the fan (6104). This channel (6104) is designed to create a suction airflow in one side of the centrifuge system (6102) and a blowing airflow on the other side. This airflow will carry particles of powder pigments. To avoid settlement of the remaining pigments on the device walls, the inside of the outer wall of the channel around the fan (6104) is covered with ceramic coating. The blowing air flow is directed to the lower vacant space of the centrifuge system (6107) and by entering a small turbine (6118) carries color substances to the lower part of the centrifuge system (6102).

The turbine (6118) is responsible for the uniformity of the transfer of color substances under controlled speed and amount to the upper space of the distribution nozzles (6613 and 6614). The turbine system (6118) consists of a box (6142) with turbine impellers (6136) inside. At the top of the turbine (6118) there is an inlet (6117) for the entry of color substances. Color materials entered from the upper inlet (6117) to the chamber between the turbine impellers (6136) and the inner wall of the turbine box (6141), which is circular and tangent to the tip of the turbine impellers blades and hence the color substances are trapped between blades and inner wall (6141). Therefore, after passing the blades in front of the upper inlet (6117), the blowing air pressure resulting from the centrifuge motor rotation (6103) is disconnected or relieved from the trapped color substances. The color substances pass the lower outlet of the turbine only under controlling the driving force of the turbine impellers (6136) and then leave the turbine and fall into the nozzles conical tank (6106).

In the nozzle tank (6106), several nozzles are embedded to guide the color substances evenly to the surface of the printing material, such as paper (204). In the first stage, at least two nozzles (6113) are considered for the color substances after passing from the turbine (6118). Painting pigments that fall from the turbine (6118) are guided to the nozzles' heads by the nozzles' walls (6140). A pressure breaker blade (6112) is installed for each of the nozzles, which pours out the color substances evenly from the first nozzles (6113) by rotating.

In addition, pressure breaker blades (6112) are responsible for mixing raised printing color substances.

The color substances released from the first stage nozzles (6113) and enter the second stage nozzles (6114). The passage of color substances from the turbine (6118), pressure breaker blades (6112) of the first stage nozzles (6113) and second-stage nozzles (6114), causes the distribution of the color substances on the surface of the PM (204) to acquire maximum uniformity, softness and without any disturbance.

The printing material (204) is placed on the surface of the vacuum cylinder (612). The perforated plates on the cylinder (611) fix the PM (204) in the desired position by the vacuum force. The surface of the PM (204) that was previously printed on the Inkjet heads (602) and the printed pattern on paper are still wet at this stage and when placed in front of the distribution nozzles of the second stage (6114). Hence, the powder color substances adhere only to the wet printed pattern and not to other areas thus only covering the PM such as paper (204). In order to distribute the powder color substances evenly on the wet parts of the PM, a number of plates have been installed on the cylinder surface (612), and a number of vibrators (6115) have been installed on the plates, to cause vibration on these plates (6116). As the result of vibration of the PM, the pigments will be delivered evenly to all areas of the printed and wet pattern. After this stage, the color substances adhere to all the wet parts of the PM and it is necessary to remove the extra pigments from dry parts of the PM. For this purpose, some pairs of soft hairy brush rollers (6108) have been provided, which together with the suction (resulting from the centrifuge system), are used to remove excess color substances from the work (e.g. paper surface). These rollers rotate inward (in opposite direction to each other). Color substances that have not adhered to the surface of the PM are lifted upwards and suspended in the air by the brushes and suction air, and returned to the system for reuse. To improve the effect of the brushes (6108), a channel for pressure making and air dividing (6111) has been embedded in the upper part of the pairs of brushes (6108), which directs the blowing air to the vertical channels (6127) and then to the vertical nozzles (6122). At the end of each vertical nozzle one small truncated square pyramid (6119) has been embedded inclined to the nozzle axis, to reduce the cross-sectional area of the nozzles and increase the air pressure of the blower and turn the wind direction from parallel to the angled blowing relative to the PM.

Two blower nozzles (6122) have been installed for each pair of brushes. At the junction of the vertical channels (6127) to the nozzles (6122), a solenoid or electric valve (6121) is provided per nozzle to increase the effect and power of the air blown from the nozzle (6119) and opens the nozzle path only when the printed PM (204) is in the front of the pair of brushes (6108). The solenoid valve (6121) is controlled by the operation of an optical sensor (6130).

The air blown into the channel (6111) is supplied by a pressure air tank (6110). The pressure inside the air tank (6110) is maintained by the centrifuge (6102).

The lifted color substances from the surface of the PM (204) after passing the soft brushes (6108), are transferred to the channel around the centrifuge fan (6104) along with the suction air flow. A filtration valve (6109) with a mesh filter has been installed in the path of the color substances entering the channel around the fan (6104) to prevent unwanted waste and objects from entering the channel around the centrifuge (6104). After this valve (6109), an impeller (6105) has been embedded at the centrifuge entrance of the channel (6104) to help and strengthen the suction of the color substances and to control the volume of the suctioned substances. After passing of the substances through the impeller (6105), the color substances re-enter the channel around the centrifuge (6104) and go through the next steps for transferring on the PM (204), thus transferring and distribution of the color substances on print material cycle is fulfilled.

After removing the excess color substances by the suction nozzles (6101) from the dry parts of the PM surface, the PM is passed under the UV light (613) by the cylinder (612). At this time, while the ultraviolet (UV) compound dries under ultraviolet dryer (613), the color substances distributed by distribution system (610) dry along with the ink and the PM is transferred to the next stage by the interface cylinder (609) for final fixation. Then, during the raised printing path, the PM (204) passes through the interface cylinders (609) and the heaters (614) and (605). In order to improve the drying of the printing ink, the PM is passed through the hot air blower dryers (606) and (607) and the ink is dried along with the accompanying Nano color substances. For the purpose of fixation and ensuring a lasting and anti-wearing product, the PM is transferred to the next part.

In the delivery section (700), the nanoparticles show a chemical reaction by being exposed to hot air of infrareds (IRs) (701) and infrared heaters (702), so, they penetrate to the material (204) and add 5 to 100 Microns to the printed pattern thickness (the created thickness can be changed and controlled according to the type of work and materials). Then the PM passes through the cold air blowers (703), which blow the dry and cool air to the surface of the printed material (204), and finally the printing pattern is fixed.

In the paper and handle receiver section (800), the PM (204) is obtained from the carrier cylinders of the carrier interface by the paper retaining chained clasps (801). Then the papers are piled on top of each other on the pallet (802) to be transferred to the next steps such as cutting, binding or other processes.

In the Section of Central Computer Control (900), a computer system is installed to receive and transfer the patterns to the system, which can be controlled by the operator.

In this part, the embedded system processes the received graphic files and separates and rips the patterns of each unit based on the defined software, and sends the patterns files to the desired parts. In addition, the printed sample is analyzed in the control unit (900), and controlling and inspection of the quality by the operator, in finisher, has been possible.

INDUSTRIAL APPLICABILITY

The technology introduced in this invention can meet the needs of governments, which require printing, banknotes, securities, and anti-forgery documents (such as cheque, promissory notes, bonds, health labels and food and medicine related products, which require more security features), and have to buy and/or import expensive machinery which they might not be able to afford.

This system, due to its low cost and better affordability can be used even for documents that need to be printed in low circulation or in low numbers, since; it makes the printing costs in low circulation affordable and practical.

This technology can be used in all printing systems including roll and sheet Offset, Flexo, Helio, digital and Inkjet printing.

ADVANTAGEOUS EFFECTS OF THE INVENTION

The following goals and benefits have been achieved in the printing industry using the technology introduced in this invention:

By replacing a digital full color Inkjet system and using the existing technologies of Inkjet heads with very small experimental and specialized changes in invisible, raised, phosphorous printing parts instead of waterless dry offset printing system, a set of units and equipment is provided that it is possible to print with the desired quality without the need for infrastructures and high cost needed in previous devices.

Elimination of the necessary huge and complex infrastructures for printing in the invented part with the help of the invented system and ink.

Increasing the quality and wide range of choices in the number of colors (16 million color combinations) continuously with an ALL in ONE device. All steps of printing securities with all elements and complex security features are conducted in one device.

Quick printing and removal of infrastructure, plates, gravures, gelatins, reducing the time required to change the pattern (less than 30 Sec.).

Possibility to conduct an especial print with a minimum circulation (at least 6 times more quality).

The possibility of printing even one sheet means that, the required tools and infrastructures, which costs a lot of money and requires a considerable amount of time (drawbacks of the current technology for low circulation printing of securities) have been resolved in the presented system. That means all those infrastructures have been removed and the time and costs of printing have been significantly reduced; as a result, the circulation limit has been eliminated. Therefore, the invented technology is a suitable method to print the anti-forgery documents and securities.

In the previous technology, regardless of high cost and time-consuming process, the raised printing on documents, which is the most important security feature of securities, is acceptable but after about six months of using by people, the raised prints are removed. Therefore, their security features are lost, that is, the INTAGLIO raised print is visible in new paper money, but unfortunately, it disappears in the old paper monies.

In the invented printing process, the accuracy, lifetime, and quality of the printed pattern are at least 10 times more than the same in the previous technology due to the effect of printed color substances on paper or printing material in a completely uniform manner and with full coverage at the pattern. Even the number of print colors created by the invented process is not comparable to the INTAGLIO printing technology, because at most 4 separate colors are used in the former and the colors cannot be combined, but in the latter one (the innovative technology) the four main combined colors and other separate colors can be used and this makes possible to use more than 16 million colors. It is worth noting that all of the printing processes are done by an Inkjet printing digital system, and the printed pattern has more durability, quality, color sharpness, image resolution, and processing accuracy.

Printing invisible patterns that are conducted in invisible security ink unit (301) is used in security printing containing an invisible mark, pattern, or word on paper, which are not visible by unaided eyes, but when scanning or copying the invisible pattern, it will be seen that is very significant to prevent forgery.

in the current technology, for printing the phosphorous and fluorescent patterns and images in unit (304) and printing pattern, writing, and images color, using CMYK+LM+LC color in unit (307), huge devices as well as infrastructural costs such as plates and gelatin plates are needed. Even they need special equipment and work force to produce some infrastructures such as the plates.

The most important issue and the focus of the present invention is the security printing i.e. raised print, which is conducted in the current traditional technology using intaglio devices with four separate colors and plates that is a high cost technology.

The technology introduced in this invention, can be used in various fields such as packaging or wrappings in the healthcare and food industry to increase security and prevent forgery in packaging due to the reduced cost of security features and ease of printing process.

This invention adds antibacterial feature to the documents, especially banknotes, and reduces the contaminants of security papers (such as viruses as Covid19, stains, dirt, people's writings, etc.). Since the paper money have the important role in healthy of a community, antibacterial paper money in turn will enhance the health and hygiene of a community.

Printing serial number and privatized barcodes and the possibility of printing variable information in all stages of units (color, invisible, fluorescent, phosphorous and even raised print with variable information) and using CTS system, data transfer from computer to system, is possible in one stage with the feeding of paper into the device and it is completed without causing waste.

The invention claimed is:

1. A system for printing documents and anti-forgery security papers especially banknotes comprising:

a mechanical feeding mechanism;

a hologram pattern print section;

an invisible ink, a fluorescent color and a main color pattern printing section using at least three ink jet units;

a varnish coating section;

a rotating cylindrical silkscreen printing section for optical variable ink (OVI);

a raised printing section comprising:

at least one UV inkjet printing head, and a raised pattern powder pigments transmission and distribution system designed to transfer powder pigments by an airflow on to a surface of a printing material and create at least 16 million varieties of colors by combining four main colors;

a delivery section;

a paper and handle receiving section; and a central computer control section;

wherein the hologram pattern print section, the invisible ink, fluorescent color and main colors pattern printing section, the varnish coating section, the raised printing section, and the rotating cylindrical silkscreen printing section are integrated in a single machine, and wherein the airflow is generated by a centrifuge system comprising a centrifugal motor providing a suction airflow and a blowing airflow to transfer the powder pigments through a channel around the centrifugal motor to a chamber below the centrifugal motor and then to a turbine.

2. The system according to claim 1, wherein the turbine comprises a turbine box with a turbine impeller, wherein one inlet is embedded at a top of the turbine for entering the pigments and one outlet for an exit of the pigments allows the pigments to fall through the outlet into at least one conical reservoir.

3. The system according to claim 2, wherein in the at least one conical reservoir, at least one nozzle installed for a smooth distribution of the pigments to the surface of the printing material, wherein color substances falling from the turbine are directed by walls of first nozzles to outlets of the first nozzles.

4. The system according to claim 3, wherein each of the first nozzles has at least one pressure-breaker, wherein the color substances are mixed together by a rotational movement of the pressure-breaker and then evenly are emitted from the outlets of the first nozzles on the surface of the printing material.

5. The system according to claim 4, where the color substances enter into at least one second stage nozzle following passing the first nozzles.

6. The system according to claim 5, wherein the at least one UV inkjet printing head prints a pattern on the printing material before a distribution of powder pigments from the at least one second stage nozzle, to make the color substances adhere on wet parts of the printing material.

7. The system according to claim 2, wherein tips of the turbine impeller are installed tangent to an internal wall of the turbine box such that the pigments are trapped between the turbine impellers and the internal wall of the turbine box, upon a circulation of the turbine.

8. The system according to claim 1, wherein a perforated cylinder fixes the printing material in a predetermined position by a vacuum force.

9. The system according to claim 8, wherein plates are installed on a surface of the perforated cylinder, wherein at least one vibrator is installed on the surface of the perforated cylinder, and the at least one vibrator creates a vibration on the plates and the printing material, so as to cause an even pigments distribution to all wet areas of a printed pattern.

10. The system according to claim 6, wherein at least a pair of soft brush rollers is installed next to the at least one second stage nozzle, wherein an air suction between the pair of soft brush rollers is configured to separate excess color substances from the printing material along with an action of brushing by the pair of soft brush rollers.

11. The system according to claim 10, wherein a channel of air pressure and air divider is installed in an upper part of the pair of soft brush rollers, the channel leads a blowing air flow directed to vertical channels and then to vertical nozzles.

12. The system according to claim 11, wherein at least one truncated square pyramid is installed at a tip of each of the vertical nozzles, wherein the at least one truncated square pyramid is inclined to an axis of the vertical nozzles.

13. The system according to claim 11, wherein at least two blower nozzles are installed per each of the pair of soft brush rollers.

14. The system according to claim 11, wherein at a junction of the vertical channels with the vertical nozzles, at least one solenoid valve is installed per nozzle to open a path of the vertical nozzles when the printing material passes through the pair of soft brush rollers.

15. The system according to claim 14, wherein the at least one solenoid valve receives commands from at least one optical sensor.

16. The system according to claim 11, wherein the air blown into the channel is supplied by a wind tank.

17. The system according to claim 1, wherein a filter valve is installed at an entrance of the channel around a centrifuge fan, wherein the filter valve prevents unwanted waste and objects from entering the channel.

18. The system according to claim 17, wherein an impeller is installed following the filter valve to help and strengthen a suction of color substances and to control an amount of suctioned color substances entering the channel-around the centrifuge fan.

19. The system according to claim 1, wherein an inside of an outer wall of the channel around the centrifuge motor is covered with a ceramic coating to prevent the pigments from sticking to an inside of the outer wall of the channel.

20. The system according to claim 1, wherein in the raised printing section, the printing material is passed through a UV light source by a cylinder following a transmission and distribution of powder pigments of the raised printing section then, a series of interface cylinders passes the printing material through a plurality of heaters and a set of hot air dryers, respectively.

21. The system according to claim 1, wherein in the hologram pattern print section, a pattern of UV inkjet printing is printed using at least one digital inkjet printing head and with a computer command, and the printed pattern is dried with at least one UV light source.

22. The system according to claim 21, wherein a pattern for hologram printing is transferred due to at least one roller pressure on the printing material and a roll of hologram foil on UV ink wet parts of the printing material.

23. The system according to claim 1, wherein an invisible print is printed using at least one inkjet head, the invisible print is visible under UV light on the printing material and at least one UV dryer dries the invisible print.

24. The system according to claim 1, wherein phosphorus and fluorescent UV ink is printed in a fluorescent printing unit on the printing material using at least one inkjet head and the phosphorus and fluorescent UV ink is dried through at least one UV dryer.

25. The system according to claim 1, wherein guilloche security designs are printed using at least one inkjet head with two additional colors and one additional head of light blue and magenta red, on the printed material, then the patterns will be dried through at least one UV dryer.

26. The system according to claim 1, wherein the coating varnish printing is applied using a cylindrical printing system on the printing material and in a case of UV varnish drying with at least one UV dryer and for water base varnish drying at least one hot air dryer and at least one IR dry air system are used.

27. The system according to claim 26, wherein the varnish coating section further comprises a copper roller with a chrome-plated coating, wherein the copper roller is immersed in a tray containing varnish and an antibacterial material and transfers substances from the tray to an anilox cylinder.

28. The system according to claim 27, wherein a uniformity of coating varnish and antibacterial varnish on the copper roller with the chrome-plated coating is conducted by a blade installed inside the tray of the substances.

29. The system according to claim 27, wherein at least one hot air dryer dries varnish containing the antibacterial material.

30. The system according to claim 1, wherein an OVI printing unit has a rotating silkscreen printing unit, wherein the rotating silkscreen printing unit engraves a received pattern from a computer using a rotary drum of Risography printing technology and a master fabricating system at least by a thermal head on a paper and a polymerized master laminated to each other and fixes the polymerized master on a surface of a drum.

31. The system according to claim 30, wherein the OVI printing unit further comprises a squeegee roller blade, wherein the squeegee roller blade passes the ink through the polymerized master with pressure and transfers the polymerized master on the printing material.

32. The system according to claim 31, wherein the OVI printing unit further is equipped with a hot air dryer.

33. The system according to claim 1, wherein in the delivery section, at least one infrared dryer (IR) hot air dryer is used to cause nanoscale pigments to react with the printing material and create a raised print with a controllable thickness.

34. The system according to claim 1, wherein at least one cold air blower blows dry and cool air to the surface of the printing material.

35. A raised printing section for a system for printing documents and anti-forgery security papers, the raised printing section comprising at least one UV inkjet printing head and a raised pattern powder pigments transmission and distribution system designed to transfer powder pigments by an airflow on to a surface of a printing material and create at least 16 million varieties of colors by combining four main colors, wherein the airflow is generated by a centrifuge system comprising a centrifuge motor providing a suction airflow and a blowing airflow to transfer the powder pigments through a channel around the centrifuge motor to a chamber below the centrifuge motor and then to a turbine.

36. The raised printing section according to claim 35, wherein the turbine comprises a turbine box with a turbine impeller, wherein one inlet is embedded at a top of the turbine for entering the pigments and one outlet for an exit of the pigments allows the pigments to fall through the outlet into at least one conical reservoir.

37. The raised printing section according to claim 36, wherein in the at least one reservoir, at least one nozzle is installed for a smooth distribution of the pigments to the surface of the printing material such as paper, wherein color substances falling from the turbine are directed by walls of first nozzles to outlets of the first nozzles.

38. The raised printing section according to claim 37, wherein each of first nozzles has at least one pressure-breaker, wherein the color substances are mixed together by a rotational movement of the pressure-breaker and then evenly are emitted from the outlets of the first nozzles on the surface of the printing material.

39. The raised printing section according to claim 38, where the color substances enter into at least one second stage nozzle following passing the first nozzles.

40. The raised printing section according to claim 39, wherein the at least one UV inkjet printing head prints a pattern on the printing material before a distribution of powder pigments from the at least one second stage nozzle, to make the color substances adhere on wet parts of the printing material.

41. The raised printing section according to claim 36, wherein tips of the turbine impeller are installed tangent to an internal wall of the turbine box such that the pigments are trapped between the turbine impellers and the internal wall of the turbine box, upon a circulation of the turbine.

42. The raised printing section according to claim 35, wherein a perforated cylinder fixes the printing material in a predetermined position by a vacuum force.

43. The raised printing section according to claim 42, wherein plates are installed on a surface of the perforated cylinder, wherein at least one vibrator is installed on the surface of the perforated cylinder, and the at least one vibrator creates a vibration on the plates and the printing material, so as to cause an even pigments distribution to all wet areas of a printed pattern.

44. The raised printing section according to claim 40, wherein at least a pair of soft brush rollers is installed next to the at least one second stage nozzle, wherein an air suction between the pair of soft brush rollers is configured to separate excess color substances from the printing material along with an action of brushing by the pair of soft brush rollers.

45. The raised printing section according to claim 44, wherein a channel of air pressure and air divider is installed in an upper part of the pair of soft brush rollers, the channel leads a blowing air flow directed to vertical channels and then to vertical nozzles.

46. The raised printing section according to claim 45, wherein at least one truncated square pyramid is installed at a tip of each of the vertical nozzles, wherein the at least one truncated square pyramid is inclined to an axis of the vertical nozzles.

47. The raised printing section according to claim 45, wherein at least two blower nozzles are installed per each of the pair of soft brush rollers.

48. The raised printing section according to claim 45, wherein at a junction of the vertical channels with the vertical nozzles, at least one solenoid valve is installed per nozzle to open a path of the vertical nozzles when the printing material passes through the pair of soft brush rollers.

49. The raised printing section according to claim 48, wherein the at least one solenoid valve receives commands from at least one optical sensor.

50. The raised printing section according to claim 45, wherein the air blown into the channel is supplied by a wind tank.

51. The raised printing section according to claim 35, wherein a filter valve is installed at an entrance of the channel around a centrifuge fan, wherein the filter valve prevents unwanted waste and objects from entering the channel.

52. The raised printing section according to claim 51, wherein an impeller is installed following the filter valve to help and strengthen a suction of color substances and to control an amount of suctioned color substances entering the channel-around the centrifuge fan.

53. The raised printing section according to claim 35, wherein an inside of an outer wall of the channel around the centrifuge motor is covered with a ceramic coating to prevent the pigments from sticking to the inside of the outer wall of the channel.

54. The raised printing section according to claim 35, wherein in the raised printing section, the printing material is passed through a UV light source by a cylinder following a transmission and distribution of powder pigments of the raised printing section then, a series of interface cylinders passes the printing material through a plurality of heaters and a set of hot air dryers, respectively.

55. A process of printing security features on a printing material using the raised printing section of claim 35, the process comprising the following steps:

i. creating an airflow by means of a centrifuge system comprising a centrifuge motor, a suction side, a blowing side, and a channel around the centrifuge motor connecting the suction side and the blowing side, wherein the airflow passes through the channel from the suction side towards the blowing side;

ii. transporting powder pigments in said airflow through said channel;

iii. directing the airflow from the blowing side into a chamber below the centrifuge motor and an inlet of a turbine, the turbine having a plurality of impeller blades;

iv. separating the powder pigments from the airflow and passing the separated powder pigments past an outlet of the turbine located at the bottom of the turbine by means of the impeller blades so that the separated powder pigments fall through the outlet and into a conical tank comprising a plurality of nozzles;

v. providing a printing material on a surface of a vacuum cylinder, wherein the printing material comprises a wet printed pattern on its side facing away from the vacuum cylinder, wherein the wet printed pattern has been produced by at least one UV inkjet printing head;

vi. distributing the powder pigments on the surface of the printing material by the plurality of nozzles, thereby adhering the powder pigments to the wet printed pattern; and vii. removing excess powder pigments not adhered to the wet printed pattern by at least one pair of soft hairy brush rollers and returning the brushed-off powder pigments for reuse by suction into the suction side of the centrifuge system.

* * * * *